United States Patent [19]
Shiobara et al.

[11] Patent Number: 4,701,479
[45] Date of Patent: Oct. 20, 1987

[54] EPOXY RESIN-BASED COMPOSITION FOR ENCAPSULATION OF SEMICONDUCTOR DEVICES

[75] Inventors: Toshio Shiobara; Kazutoshi Tomiyoshi, both of Annaka, Japan

[73] Assignee: Shin-Etsu Chemical Co., Ltd., Tokyo, Japan

[21] Appl. No.: 865,390

[22] Filed: May 21, 1986

[30] Foreign Application Priority Data

May 22, 1985 [JP] Japan ................................. 60-110042

[51] Int. Cl.$^4$ ........................... C08K 7/00; C08K 3/36
[52] U.S. Cl. ................................. 523/220; 523/443; 523/466
[58] Field of Search ................. 523/443, 466, 220

[56] References Cited

U.S. PATENT DOCUMENTS

| | | | |
|---|---|---|---|
| 2,866,112 | 12/1958 | Matz | 523/466 |
| 3,637,572 | 1/1972 | Ogata et al. | 523/220 |
| 4,271,061 | 6/1981 | Suzuki et al. | 523/443 |
| 4,293,479 | 10/1981 | Hanada et al. | 523/443 |
| 4,615,741 | 10/1986 | Kobayashi et al. | 523/443 |

*Primary Examiner*—Lewis T. Jacobs
*Attorney, Agent, or Firm*—Hopgood, Calimafde, Kalil, Blaustein & Judlowe

[57] ABSTRACT

The inorganic filler in the inventive epoxy resin-based composition is a combination of two kinds of quartz powder of which one is a quartz powder having a spherical particle form and the other is a pulverized quartz powder in a specified proportion. The resin composition is highly flowable and capable of giving encapsulation of semiconductor devices with little fins having outstandingly small thermal expansion coefficient and highly resistant against crack formation.

2 Claims, No Drawings

EPOXY RESIN-BASED COMPOSITION FOR ENCAPSULATION OF SEMICONDUCTOR DEVICES

BACKGROUND OF THE INVENTION

The present invention relates to an epoxy resin-based composition suitable for encapsulation of semiconductor devices or, more particularly, to an epoxy resin-based composition for encapsulation of semiconductor devices capable of exhibiting very high flowability in the encapsulating works of semiconductor devices and also capable of giving a molded body with little fins having an outstandingly small coefficient of thermal expansion and high resistance against crack formation.

Various kinds of synthetic resin compositions are known and used in the prior art as a material for encapsulation of semiconductor devices including epoxy resins, silicone resins, diallyl phthalate resins, phenolic resins, polyphenylnene sulfide resins and the like as the principal ingredient thereof. Among them, in particular, phenol-curable epoxy resins are currently used most widely and in the largest quantity in view of the advantages thereof in respect of the moisture resistance, mechanical properties, productivity, cost and so on.

As is known, the encapsulating works of semiconductor devices with a resin composition are mostly undertaken by the techniques of low-pressure transfer molding using a metal mold having cavities each for a piece of the semiconductor device. It is a trend in recent years that larger and larger metal molds are used in the encapsulating works in order to be provided with an increased number of cavities. When a large metal mold with many cavities is used for the encapsulating work, a drawback is sometimes caused that a part of the metal mold or cavities is left unfilled with the resin composition so that it is eagerly desired that the resin composition used for the low-pressure transfer molding should be imparted with particularly high flowability without sacrificing other properties.

In this regard, several proposals have been made for the improvement of phenol-curable epoxy resin-based compositions including, first, use of a resin having a low melt viscosity or admixture of a low-molecular diluent, second, decrease of the amount of the curing catalyst and, third, decrease of the amount of the inorganic filler. These proposed methods each have several disadvantages and problems. For example, the improved flowability of the resin composition obtained by the first method is always accompanied by the increase in the fins by molding and, when a diluent is used, the molded bodies suffer the undesirable phenomenon of bleeding on the surface or decreased dimensional stability as a consequence of the increased content of volatile matters. Moreover, a serious difficulty is sometimes encountered in the accelerated corrosion of the aluminum wirings. The second method naturally results in the decreased curability of the resin composition which is retrogressive against the requirement for an increased curing velocity of the composition from the standpoint of productivity improvement. The third method is also disadvantageous due to the increase in the coefficient of thermal expansion and stress in the molded body of the resin composition. Namely, the molded body is less resistant against crack formation and an increased stress is given to the aluminum wirings and passivation films on the surface of the silicon chip encapsulated with the resin composition in addition to the decrease in the moisture resistance.

It is also known that the stress in the molded body of an epoxy resin-based composition can be decreased by compounding the composition with a quartz powder having a spherical particle form as the inorganic filler. According to the disclosure in Japanese Patent Kokai No. 58-138740, an epoxy resin-based composition may contain from 30 to 80% by weight of a fused silica powder of spherical particle form having an average particle diameter in the range from 1 to 60 $\mu$m. Such a resin composition, however, is still not quite satisfactory in respect of the flowability in addition to the relatively low resistance of the molded bodies against crack formation.

SUMMARY OF THE INVENTION

Accordingly, the present invention has an object to provide a means for dissolving the above described disadvantages in the prior art resin compositions and the epoxy resin-based composition for encapsulation of semiconductor devices provided by the invention comprises:

(a) 100 parts by weight of a phenol-curable epoxy resin; and (b) from 100 to 500 parts by weight of a combination of silica fillers composed of
  (b-1) from 1 to 80% by weight of a quartz powder having a spherical particle form with an average particle diameter in the range from 1 to 25 $\mu$m, and
  (b-2) from 20 to 99% by weight of a pulverized quartz powder.

DETAILED DESCRIPTION OF THE PREFERRED EMBODIMENTS

As is described in the above given summary, the most characteristic feature in the inventive epoxy resin-based composition is the use of two kinds of different quartz powders in combination as the inorganic filler. By virtue of this unique feature, the resin composition is imparted with greatly improved flowability and still capable of giving a molded body with outstandingly decreased fins by molding. In particular, the epoxy resin can be loaded with a remarkably large amount of the inorganic filler when the pulverized quartz powder has such a particle size distribution that the content of particles having a particle size larger than 20 $\mu$m is 10% by weight or lower and the content of particles having a particle size smaller than 1 $\mu$m is 15% by weight or lower. Such a resin composition of high filler loading is of course advantageous in respect of the small thermal expansion coefficient and high resistance against crack formation of the molded bodies thereof in which localized stress can be effectively prevented. The above mentioned limitation in the particle size distribution is particularly advantageous in respect of the very low content of coarse pulverized particles having a particle size of 20 $\mu$m or larger. When highly integrated ICs such as 256 kDRAM, 256 kSRAM, 1 MDRAM and so on are encapsulated with the inventive resin composition, for example, localized stress on the surface of the semiconductor device can be minimized by virtue of the extremely small number of sharp edges of coarse particles responsible therefor contributing to the stabilization of the performance of the semiconductor devices.

The phenol-curable epoxy resin as the component (a) of the inventive composition is a known material composed of an epoxy resin having at least two epoxy groups in a molecule and a phenolic curing agent. The epoxy resin is not particularly limitative in respect of the molecular structure and molecular weight provided that the resin is curable by admixing the phenolic curing agent described below. Suitable epoxy resins include the epoxy resins synthesized from epichlorohydrin and a novolac resin with bisphenols as a class thereof, alicyclic epoxy resins and halogen-, e.g. chlorine- and bromine-, containing epoxy resins. It is optional that the epoxy resin is used in combination with a small amount of a monoepoxy compound such as styrene oxide, cyclohexene oxide, propylene oxide, methyl glycidyl ether, ethyl glycidyl ether, phenyl glycidyl ether, allyl glycidyl ether, octylene oxide, dodecene oxide and the like.

The phenolic curing agent combined with the epoxy resin is also a known material such as phenol novolacs, cresol novolacs and the like having at least two hydroxy groups in a molecule. Two kinds or more of such phenolic curing agents can be used in combination according to need.

If desired, the phenol-curable epoxy resin may be further admixed with a curing accelerator to promote the reaction between the epoxy resin and the phenolic curing agent. Exemplary of suitable curing accelerators are imidazole and derivatives thereof, tertiary amine derivatives, phosphine derivatives, cycloamidine derivatives and the like.

The inorganic filler compounded with the above described phenol-curable epoxy resin is a combination of two types of quartz powders of which one is a quartz powder having a spherical particle form, referred to as a spherical quartz powder hereinbelow, and the other is a pulverized quartz powder. Each of these quartz powders should have an average particle diameter in the range from 1 to 25 $\mu$m. When the quartz powders are coarser than above, several drawbacks are caused in the molded bodies of the resin composition such as occurrence of resin leak and formation of fins as well as decrease in the mechanical strengths and deformation of the gold wirings. When the particles of the quartz powders are too fine, on the other hand, cracks are sometimes formed in the molded bodies of the resin composition.

The particles of the spheric quartz powder, of course, may not have a perfect sphericity but the aspect ratio thereof can be in the range from 1.0 to 1.3. Such a spherical quartz powder can be obtained by subjecting a powder of natural or synthetic quartz to fusion in a flame of a combustible gas such as hydrogen and propane admixed with oxygen or by hydrolyzing a hydrolyzable silane compound such as tetramethoxy silane and tetraethoxy silane in an organic solvent such as toluene.

The pulverized quartz powder is a powder of a crystalline or amorphous quartz and can be obtained by mechanically pulverizing a block of natural or synthetic quartz. Various grades of such pulverized quartz powders are commercially available as a filler in resin compositions used for encapsulating semiconductor devices. The pulverized quartz powder should preferably have such a particle size distribution that the contents of the particles having a particle size larger than 20 $\mu$m and smaller than 1 $\mu$m are not exceeding 10% by weight and 15% by weight, respectively. When the particles of the pulverized quartz powder are coarser than above, the particles may have sharp edges of acute angles so that more cracks are formed in the passivation films when the molded bodies of the resin composition are subjected to cycles of repeated heating and chilling.

The mixing ratio of the spherical quartz powder to the pulverized quartz powder should be in the range from 1:99 or, preferably, from 5:95 to 80:20 by weight. When the weight proportion of the spherical quartz powder is too small, the resin composition filled with the quartz powders cannot be imparted with sufficient flowability and the molded body thereof may be under a relatively large stress. When the weight proportion of the spherical quartz powder is too large, on the other hand, the flowability of the resin composition is also insufficient and the molded body thereof may be less resistant against crack formation with occurrence of resin leak and formation of fins. When the electronic device to be encapsulated with the resin composition is an IC of 256 kDRAM or 1 MDRAM, it is desirable that the quartz powders should be as free as possible from impurities of naturally occurring radioactive elements so that the starting materials of the quartz powders should be selected from those containing uranium and/or thorium in an amount of 1 ppb or smaller. It is optional that the quartz powders are treated in advance with a priming agent such as a so-called carbon-functional silane compound in order to improve the adhesion between the surface of the quartz particles and the resinous matrix.

The epoxy resin-based composition of the invention can be prepared by uniformly blending the phenol-curable epoxy resin with a combination of the two kinds of the quartz powders. The amount of the quartz powders as combined should be in the range from 100 to 500 parts by weight per 100 parts by weight of the phenol-curable epoxy resin. When the amount of the quartz powders is too small, the molded body of the composition has a relatively large thermal expansion coefficient so that it is less resistant against crack formation. When the amount of the quartz powders is too large, the resin composition may be poorly flowable.

The epoxy resin-based composition of the invention may be further admixed with various kinds of additives known in the art including pigments such as carbon black, moldrelease agents such as natural wax, flame-retardant agents, flexibility improvers such as organopolysiloxanes, phenolic resins modified with an organopolysiloxane, epoxidized novolac resins and modified butadiene rubbers, carbon-functional silanes and so on.

In the following, the epoxy resin-based composition of the invention is described in more detail by way of Examples and Comparative Examples, in which the expression of "parts" always refers to "parts by weight". The resin compositions prepared therein were evaluated by the properties obtained in the tests each conducted in the procedure described below.

(1) Spiral Flow

The value of spiral flow was determined by molding 20 g of the powdery epoxy resin-based composition under a pressure of the plunger of 70 kg/cm$^2$ using a metal mold according to EMMI-1-66 which was kept at a temperature of 175° C.

(2) Resin Leak and Fins

Using a metal mold for the measurement of fins having clearances of 10 $\mu$m and 30 $\mu$m, 20 g of the powdery epoxy resin-based composition were molded under conditions of the pressure of the plunger of 70 kg/cm$^2$ and the temperature of the metal mold of 175° C. and the lengths of the fin-like resin layers leaked out of the clearances were determined in mm.

(3) Thermal Expansion Coefficient

The epoxy resin-based composition was molded into a cylindrical body having a diameter of 4 mm and a length of 15 mm under the molding conditions of 2 minutes at 175° C. and the molded body was subjected to a post-cure at 180° C. for 4 hours. Determination of the linear thermal expansion coefficient was undertaken of this molded body in the temperature range from 25 to 120° C. using an instrument therefor Model AGNE DL1500 manufactured by Shinku Rika Co.

(4) Elastic Flexural Modulus

The epoxy resin-based composition was molded into a test specimen of 100 mm by 10 mm by 4 mm dimensions under the molding conditions of 2 minutes at 175° C. followed by a post-cure for 4 hours at 180° C. and the measurement was performed according to the method specified in JIS K 6911.

(5) Cracking Resistance Test

A 14 PIN IC frame to which 40 silicon chips of each 9.0 mm by 4.5 mm by 0.5 mm dimensions were applied was encapsulated with the epoxy resin-based composition under the molding conditions of 2 minutes at 175° C. followed by a post-cure at 180° C. for 4 hours. A number of test specimens prepared in this manner were subjected to a temperature-cycle test of which each cycle was composed of a chilling stage at −196° C. for 1 minute and a heating stage at +260° C. for 1 minute and the number of the test specimens on which cracks were found was counted after 20 cycles and given in % of the overall number of the test specimens.

EXAMPLES 1 TO 5 AND COMPARATIVE EXAMPLES 1 TO 3

An epoxy resin-based composition was prepared by compounding 600 parts of an epoxy resin of cresol novolac type (ECN-1270, a product by Ciba-Geigy Co.), 300 parts of a phenol novolac resin (TD 2093, a product by Dai-Nippon Ink Chemical Co.), 100 parts of an epoxy resin modified with 30% of a silicone fluid, 10 parts of triphenyl phosphine, 10 parts of carnauba wax, 100 parts of antimony trioxide, 10 parts of 3-glycidyloxypropyl trimethoxy silane and 10 parts of carbon black together with a spherical quartz powder having an average particle diameter of about 10 μm and a pulverized quartz powder each in an amount indicated in Table 1 below. Table 1 also gives the contents of the particles having a particle diameter of 20 μm or smaller and 1 μm or larger in the pulverized quartz powder in % and the average particle size thereof in μm. After preliminary blending of the components in a Henschel mixer, the resin composition was thoroughly milled in an extruder machine followed by cooling and pulverization into a powdery form of the phenol-curable epoxy resin-based composition. Eight compositions were prepared in the above described manner with different formulations of the quartz powders and each of the compositions was subjected to the tests of the properties to give the results shown in Table 1.

TABLE 1

|  |  | Example | | | | | Comparative Example | | |
|---|---|---|---|---|---|---|---|---|---|
|  |  | 1 | 2 | 3 | 4 | 5 | 1 | 2 | 3 |
| Spherical quartz powder, parts |  | 1250 | 1250 | 1250 | 1250 | 1300 | 1250 | 1250 | — |
| Pulverized quartz powder | Content of <20 μm particles, % | 99 | 93 | 95 | 80 | 99 | 99 | 50 | 80 |
|  | Content of >1 μm particles, % | 88 | 90 | 91 | 93 | 88 | 82 | 99 | 93 |
|  | Average particle diameter, μm | 3.0 | 4.2 | 3.5 | 7.0 | 3.0 | 2.7 | 30.0 | 7.0 |
|  | Parts | 1250 | 1250 | 1250 | 1250 | 1300 | 1250 | 1250 | 2600 |
| Spiral flow, inches |  | 33 | 35 | 35 | 35 | 30 | 32 | 31 | 15 |
| Fins formed, mm | 10 μm clearance | 0.6 | 0.5 | 0.4 | 0.7 | 0.5 | 0.7 | 2.6 | 0.9 |
|  | 30 μm clearance | 2.2 | 2.0 | 2.1 | 2.3 | 2.0 | 2.0 | 3.7 | 2.1 |
| Linear thermal expansion coefficient, $\times 10^{-4}$/°C. |  | 2.0 | 2.0 | 2.0 | 2.0 | 1.8 | 2.0 | 2.0 | 1.8 |
| Anti-cracking test, % |  | 0 | 0 | 0 | 0 | 0 | 10 | 0 | 0 |

EXAMPLES 6 TO 9 AND COMPARATIVE EXAMPLES 4 AND 5

Six epoxy resin-based compositions were prepared each by compounding 650 parts of a cresol novolac-type epoxy resin (EOCN 102, a product by Nippon Kayaku Co.), 300 parts of a phenol novolac resin (TD 2093, supra) and 50 parts of a brominated epoxy resin (YDB 340, a product by Toto Kasei Co.) with triphenyl phosphine, carnauba wax, antimony trioxide, 3-glycidyloxypropyl trimethoxy silane and carbon black each in the same amount as used in Examples 1 to 5 and two kinds of quartz powders each in an amount indicated in Table 2 below, of which one was a spherical quartz powder having an average particle diameter of about 7 μm and the other was a pulverized amorphous quartz powder having an average particle diameter of about 3.5 μm and containing 95% and 91% of the particles having a particle diameter of 20 μm or smaller and 1 μm or larger, respectively. Each of the thus prepared resin compositions was subjected to the tests of the properties to give the results shown in Table 2.

TABLE 2

|  | Example | | | | Comparative Example | |
|---|---|---|---|---|---|---|
|  | 6 | 7 | 8 | 9 | 4 | 5 |
| Spherical quartz powder, parts | 125 | 500 | 1250 | 2000 | 2500 | — |
| Pulverized quartz powder, parts | 2375 | 2000 | 1250 | 500 | — | 2500 |
| Weight ratio of spherical quartz powder:pulverized quartz powder | 5:95 | 20:80 | 50:50 | 80:20 | 100:0 | 0:100 |

TABLE 2-continued

|  |  | Example | | | | Comparative Example | |
|---|---|---|---|---|---|---|---|
|  |  | 6 | 7 | 8 | 9 | 4 | 5 |
| Spiral flow, inches | | 28 | 33 | 32 | 26 | 21 | 15 |
| Fins formed, mm | 10 μm clearance | 0.5 | 0.5 | 0.5 | 0.8 | 1.0 | 0.4 |
|  | 30 μm clearance | 9.0 | 3.5 | 2.0 | 2.0 | 2.0 | 12.5 |
| Elastic flexural modulus, kg/mm$^2$ | | 1200 | 1150 | 1150 | 1100 | 1100 | 1250 |
| Anti-cracking test, % | | 0 | 0 | 0 | 30 | 100 | 0 |

EXAMPLE 10

The resin compositions prepared in Example 3 and Comparative Examples 2 and 3 were used for encapsulating 256 kDRAM ICs having uncoated chip surfaces by the techniques of transfer molding. The resin composition was preheated at 70° C. in a high-frequency preheater followed by the transfer molding of the preheated composition for 2 minutes and the molded pieces were subjected to a postcure at 180° C. for 4 hours.

The thus resin-encapsulated 256 kDRAM ICs were subjected to a heat-cycle test of 500 cycles between a chilling stage at −55° C. and a heating stage at +150° C. followed by the evaluation of the change caused in the performance which was represented by the % increase in the memory error. The results were that no increase was noted in the ICs encapsulated with the resin composition of Example 3 while the ICs encapsulated with the resin compositions of Comparative Examples 2 and 3 indicated 53% and 15% increase, respectively, in the memory error.

What is claimed is:

1. An epoxy resin-based composition for encapsulation of semiconductor devices which comprises:
    (a) 100 parts by weight of a phenol-curable epoxy resin; and
    (b) from 100 to 500 parts by weight of a combination of silica fillers composed of
        (b-1) from 1 to 80% by weight of a quartz powder having a spherical particle form with an average particle diameter in the range from 1 to 25 μm, and
        (b-2) from 20 to 99% by weight of a pulverized quartz powder with an average particle diameter in the range from 1 to 25 μm.

2. The epoxy resin-based composition as claimed in claim 1 wherein the pulverized quartz powder contains particles having a particle diameter larger than 20 μm in an amount not exceeding 10% by weight and particles having a particle diameter smaller than 1 μm in an amount not exceeding 15% by weight.

* * * * *